United States Patent Office 3,181,288
Patented May 4, 1965

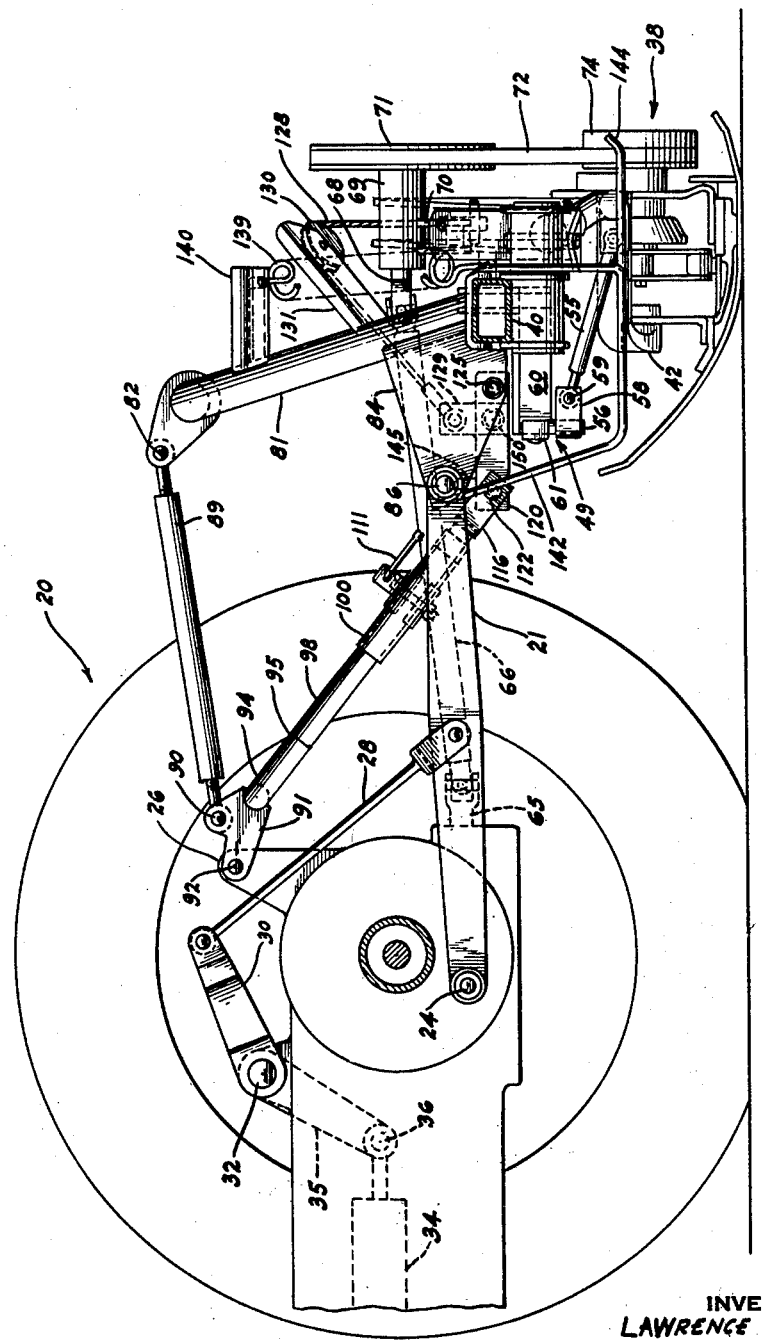

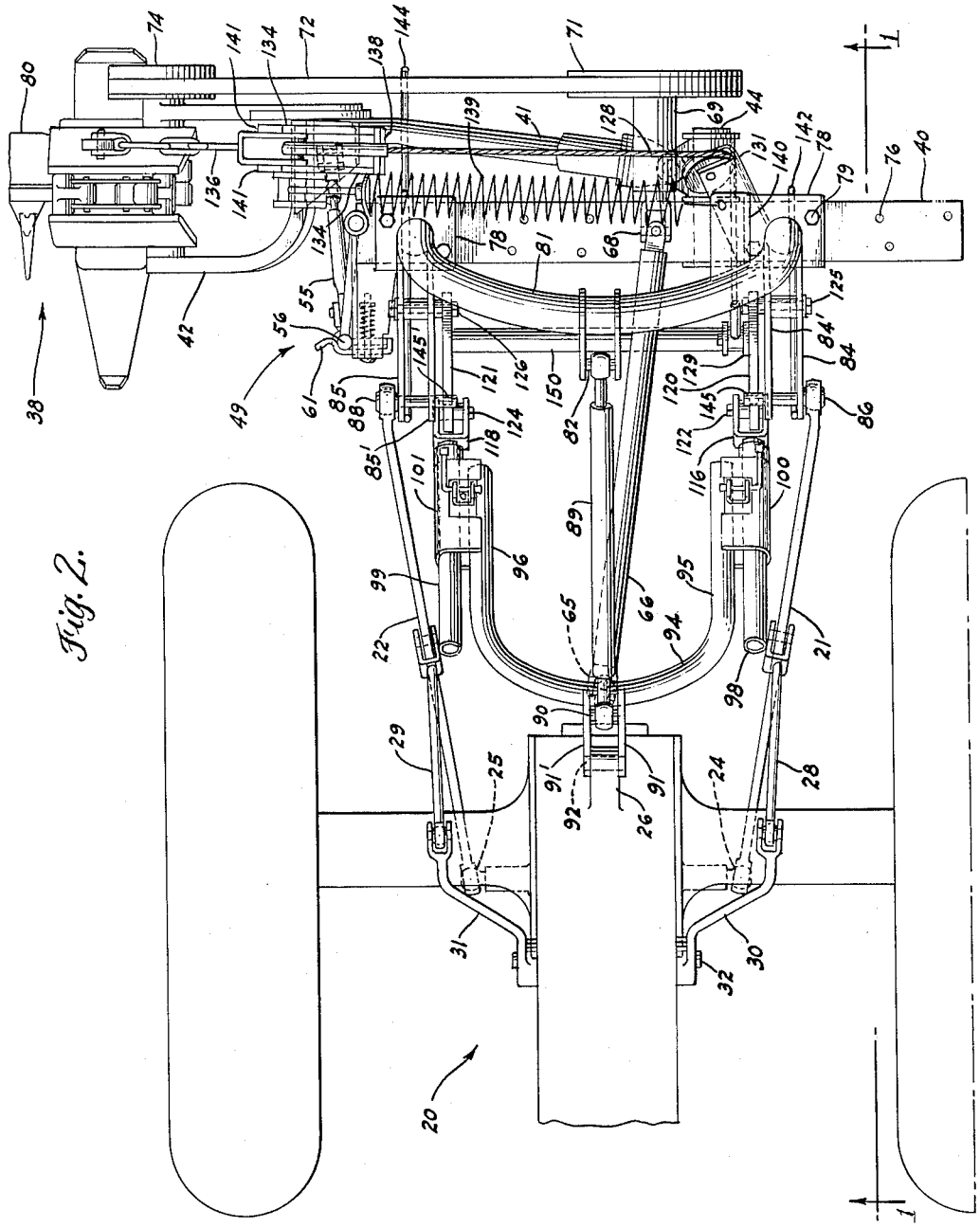

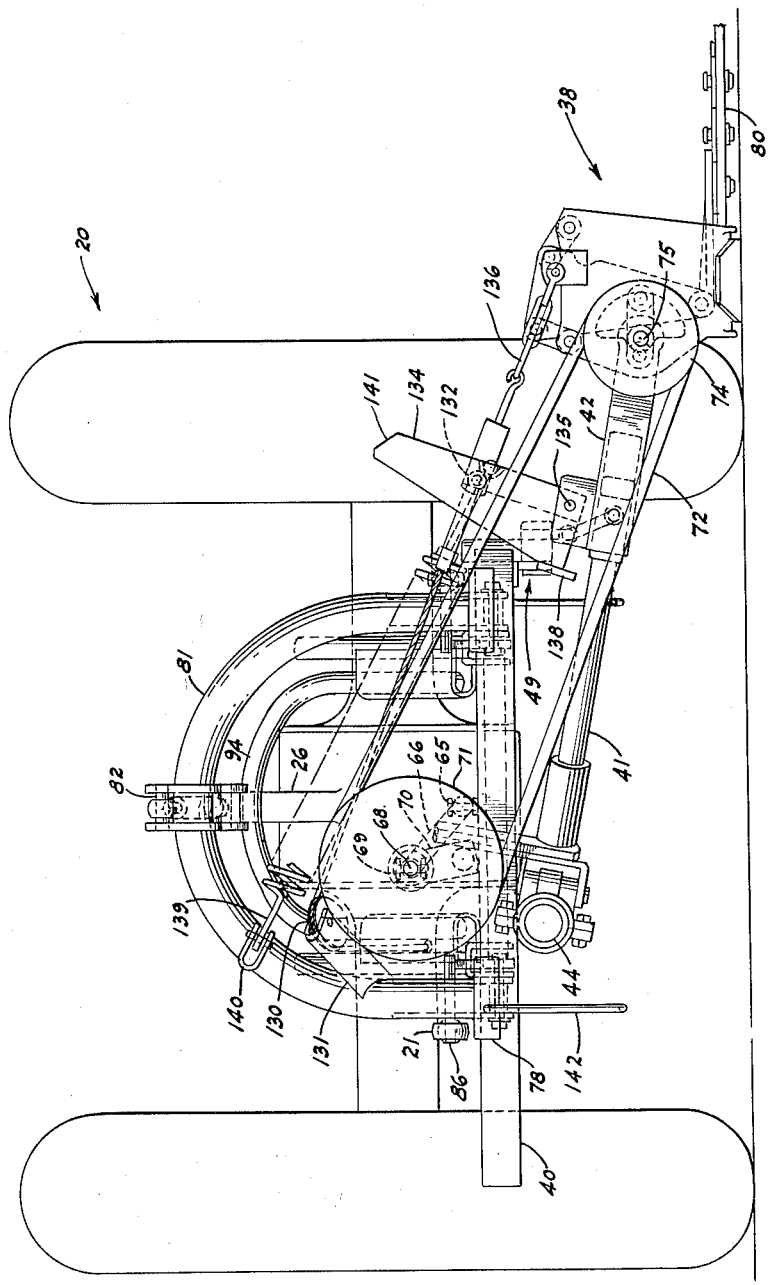

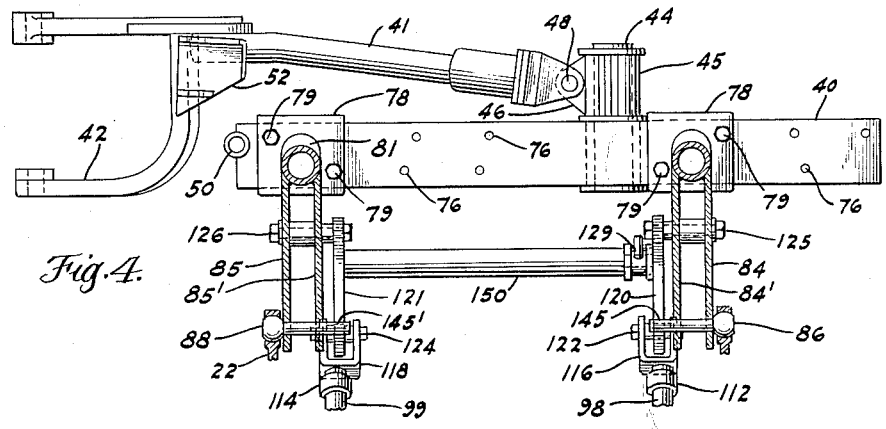
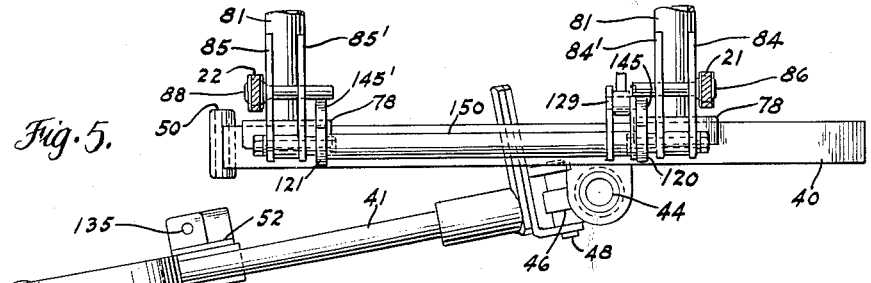
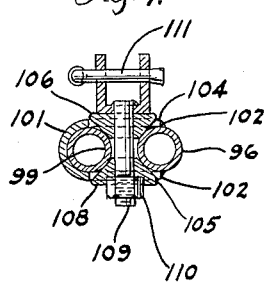
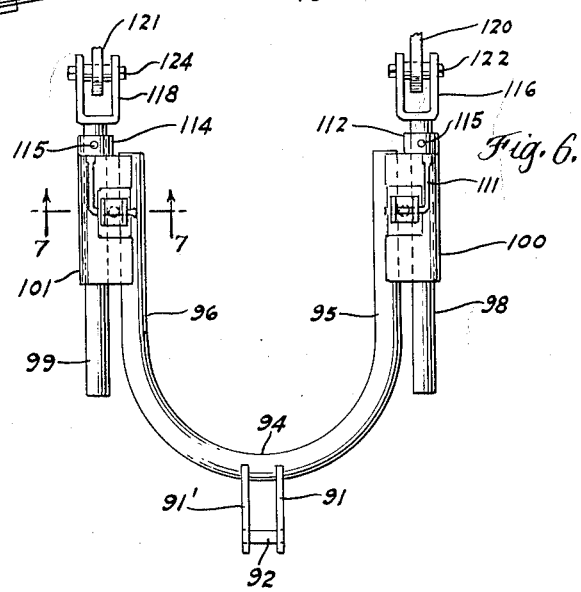

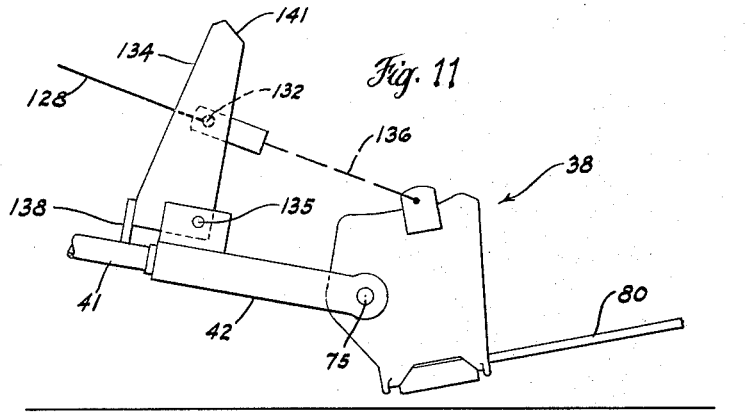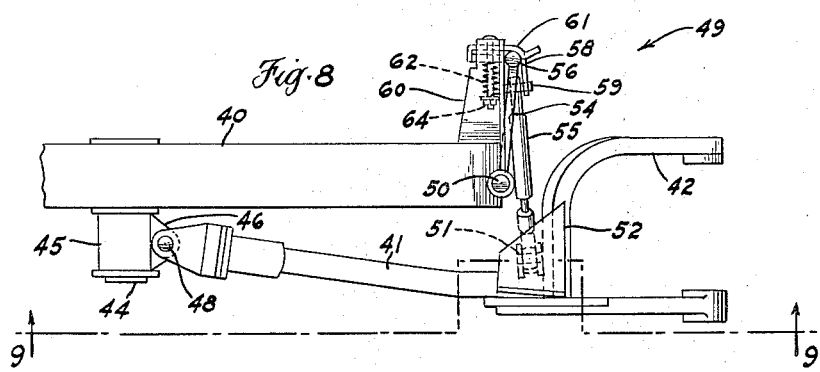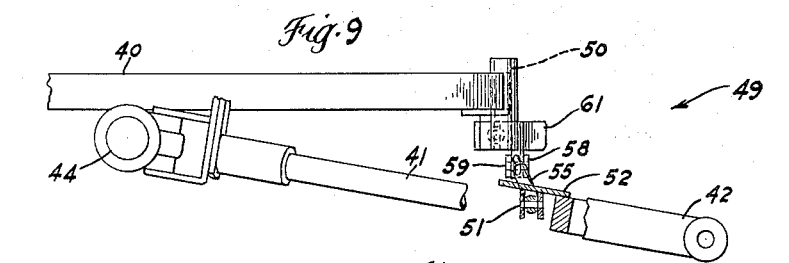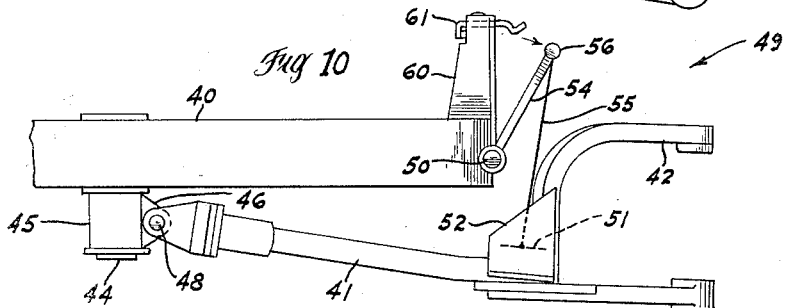

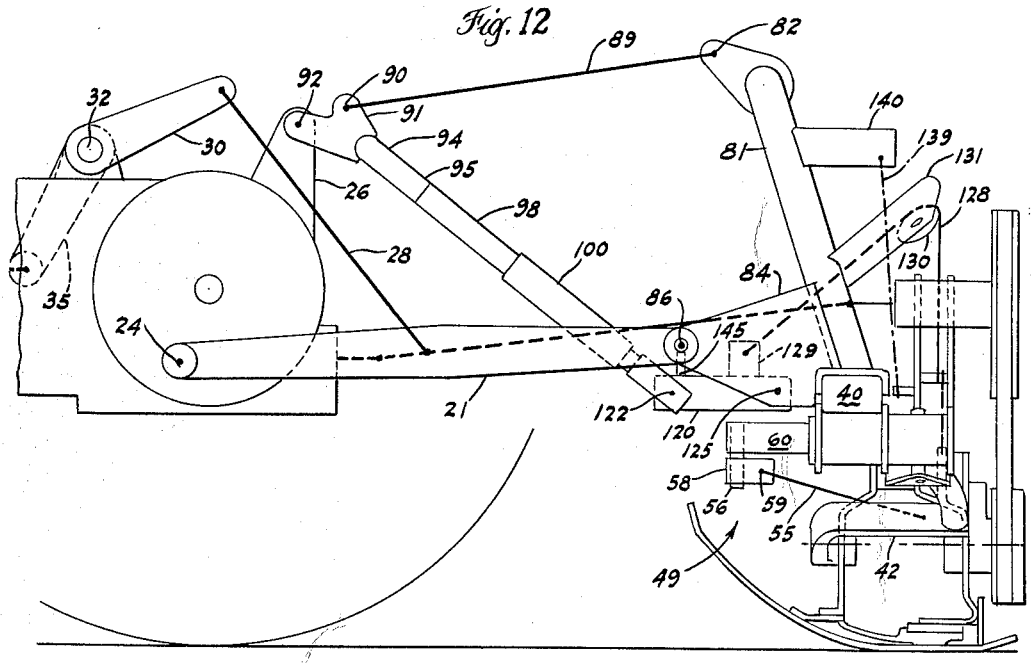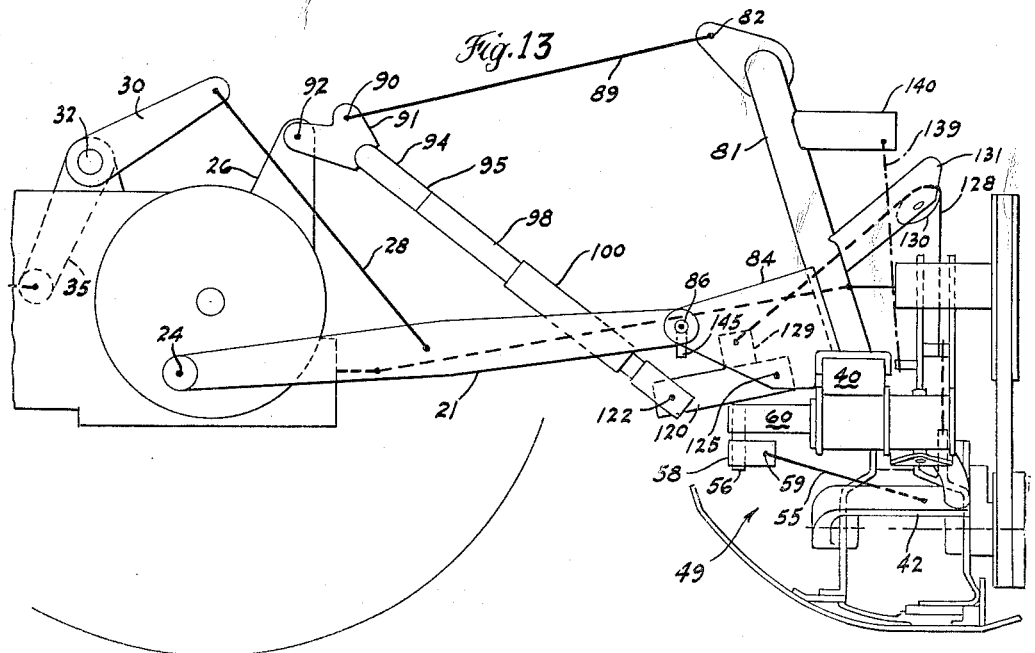

3,181,288
MOWER MOUNTING APPARATUS
Lawrence M. Halls, New Holland, Pa., assignor to Sperry
Rand Corporation, New Holland, Pa., a corporation
of Delaware
Filed July 31, 1962, Ser. No. 213,732
10 Claims. (Cl. 56—25)

This invention relates, generally, to agricultural mowers. More specifically, it relates to apparatus for mounting a mower on a tractor having a conventional three point implement hitch.

The three point implement hitch is well known in the agricultural machinery art as a means to fully mount an implement on a tractor. It comprises a pair of lower links, or drawbars, pivotally connected to, and extending rearwardly from, a tractor and an upper pivotal hitch member on the tractor spaced above and between the drawbars. Power means, usually the tractor hydraulic system, is connected to the drawbars for raising and lowering them relative to the tractor. An implement is connected to the two drawbars and to a rearwardly extending upper link pivoted on the upper rear hitch member. Raising or lowering of the drawbars by the tractor hydraulic system effects raising or lowering of the implement relative to the ground. The connection of the implement to the upper hitch member stabilizes the implement against tipping in the fore-and-aft direction.

All the three point hitch connections must allow at least vertical pivotal movement between the connected parts. In actual practice, universally movable ball joint connectors, or similar loose fitting connecting means, are used. This facilitates the manual operation of attaching a variety of different implements to the three point hitch linkage.

One problem associated with three point hitch implements is that the location and size of the three point hitch linkage varies from one make of tractor to the next, and often from one model to the next of tractors of the same make. Thus, if a farmer buys a new tractor, his existing three point hitch mower may not be mountable on the new tractor.

It is an object of this invention to provide a single apparatus which is adjustable to mount a mower on any three point hitch tractor.

With conventional three point hitch mowers, the tractor hydraulic system is employed to hold the drawbars, and hence the mower, at the proper operating height relative to the ground. During operation, periodic height adjustments are required to correct for hydraulic pressure dissipation.

It is an object of this invention to provide a three point hitch mower mounting apparatus having stop means which holds the mower at proper operating height relative to the ground, independently of the tractor hydraulic system.

While the conventional three point hitch linkage is stable in the direction of travel of the tractor, it offers relatively little resistance to lateral movement, or side sway, of the implement carried thereon. This is partially attributable to the aforementioned loose fitting joints of the linkage and to the general condition that the implement is supported at the ends of the relatively long, horizontally disposed, fore-and-aft extending drawbars. Lateral stability is a relatively minor problem for most implements, since they primarily exert drag in the direction of travel. The mower, however, exerts considerable lateral force on the three point hitch linkage. This is largely due to the fact that the cutter bar extends laterally to one side of the tractor. As the cutter bar moves forwardly into the crop material, the rearward force of the crop material on the cutter bar attempts to turn the cutter bar rearwardly about the hitch linkage. This exerts a lateral force on the linkage. The magnitude and direction of this lateral force is continually changing with variations in the density of the crop, the forward speed of the tractor, the cutting speed of the mower, or other related factors. The result is considerable lateral movement, or side sway, of the implement. Lateral forces on the hitch linkage are also encountered when the tractor makes a sharp right turn while mowing. In this case the tractor virtually pivots about the right rear wheel. This momentarily moves the mower cutter bar rearwardly into the crop material and exerts lateral force on the linkage in the direction opposite to that mentioned above. It is customary for the farmer to extend extra braces from the tractor axles to the drawbars when he mounts a mower on his three point implement hitch. Some manufacturers of three point hitches provide special braces for this purpose. This is a relatively inefficient, and not completely successful, way to resist lateral movement; since, the braces, like the drawbars, extend substantially in the fore-and-aft direction. Furthermore, these extra braces are subject to being mislaid and lost from one mowing season to the next.

It is another object of this invention to provide a three point implement hitch mower mounting apparatus incorporating means, independent of the tractor drawbars, to resist lateral movement of the apparatus as a unit relative to the tractor.

It is another object of this invention to provide on a three point implement hitch mower mounting apparatus, mechanism to convert lateral motion of the mounting apparatus as a whole into torsional stress applied directly to a torsion bar frame member incorporated in the mounting apparatus and having high resistance to torsional stress, thereby efficiently and effectively resisting lateral movement of the mower mounting apparatus relative to the tractor.

Conventional mounted mowers are difficult to attach and remove from a tractor. Unlike trail-behind and semi-mounted mowers, the mounted mower depends completely on the tractor for support. When the mower is removed from the tractor, it becomes a heavy awkward mechanism to manipulate into proper position and attitude for remounting.

It is another object of this invention to provide a three point implement hitch mower mounting apparatus having mechanically simple, fixed support means to stably support the entire apparatus on the ground and in proper position for storage and remounting on a tractor.

It is another object of this invention to provide novel means for supporting the mower cutter bar in a transport, or storage, position relative to the mounting apparatus.

It is common practice in mowers to provide mechanism to swing the cutter bar vertically relative to the mounting mechanism in response to raising of the tractor drawbars. This is desirable since the tractor hydraulic system moves the drawbars relatively slowly and it is sometimes necessary to get the cutter bar off the ground quickly, to avoid hitting an obstruction, for example.

It is another object of this invention to provide a three point implement hitch mower mounting apparatus having novel, mechanically simple means for swinging the cutter bar vertically relative the mounting apparatus in response to the raising and lowering of the tractor drawbars.

Ruggedness and economy are desirable objectives in any farm implement. These objectives are realized in the present invention by the combination of a small number of rugged structural members inter-related so as to perform a plurality of functions.

These and other objects and features of this invention will be more clearly understood from the folowing detailed description, taken in conjunction with the accompanying drawings wherein:

FIG. 1 is a sectional elevational view taken on the line 1—1 of FIG. 2 and showing the device of this invention and its relationship to a farm tractor having three point hitch linkage;

FIG. 2 is a plan view of the structure shown in FIG. 1;

FIG. 3 is a rear elevational view of the structure seen in FIGS. 1 and 2;

FIG. 4 is a fragmentary plan view of the main frame of the mower mounting apparatus of this invention;

FIG. 5 is a front elevational view of the main frame shown in FIG. 4;

FIG. 6 is a plan view of the arms which extend from the main frame of the mounting apparatus to the upper rear hitch member of the tractor;

FIG. 7 is an enlarged cross sectional view taken on the line 7—7 of FIG. 6;

FIG. 8 is a plan view of the break-away portion of the mower mounting apparatus of this invention;

FIG. 9 is a sectional view taken on the line 9—9 of FIG. 8;

FIG. 10 is a diagrammatic plan view of the break-away mechanism of FIG. 8 showing how the drag bar, and hence the mower, breaks away from the main frame of the mounting apparatus if the mower cutter bar encounters an obstruction;

FIG. 11 is a diagrammatic rear elevational view of part of the drag bar and mower showing how the mower swings vertically relative to the drag bar;

FIGS. 12 and 13 are diagrammatic side elevational views similar to FIG. 1 and showing the relative movement between parts of the mower mounting apparatus in response to movement of the tractor drawbars from a lower position, shown in FIG. 12, to a higher position, shown in FIG. 13.

Referring first to FIGS. 1 and 2 of the drawings, the numeral 20 indicates, generally, the rear portion of a tractor equipped with conventional three point implement hitch linkage. The three point hitch linkage includes a pair of rearwardly extending drawbars 21 and 22 which are mounted on opposite sides of the lower rear portion of the tractor body by universally movable ball joint connectors 24 and 25. A third, or upper rear, hitch member 26 is provided on the tractor in a position above and between the drawbars. The drawbars 21 and 22 extend rearwardly from the tractor symmetrically relative to a fore-and-aft extending vertical plane through the upper hitch member 26. The drawbars are selectively moved up or down as a unit by a pair of lift links 28 and 29 which are pivoted respectively to drawbars 21 and 22 and to lift levers 30 and 31. The lift levers 30 and 31 are rigidly connected to the opposite ends of a lift shaft 32 journalled on the tractor body. A hydraulic cylinder 34 (FIG. 1) is operable to oscillate shaft 32 by means of a lever 35 which is pivoted at 36 to the plunger of cylinder 34 and which is rigidly connected to lift shaft 32 intermediate the ends of the shaft. The tractor operator controls the operation of the hydraulic cylinder 34, thereby controlling vertically swinging movement of the drawbars about the connectors 24 and 25.

The above structure is conventional and may vary somewhat from one tractor to the next. The specific three point hitch structure shown is merely exemplary of the general type of hitch mechanism with which the present invention is intended to be employed.

The numeral 38, seen in FIGS. 1-3 indicates, generally, an agricultural mower. The particular mower shown is fully described in U.S. Patent No. 3,113,412. The apparatus of this invention, however, is not dependent upon this particular mower; any known mower of the type having an elongate laterally projecting cutter bar may be mounted on a three point implement hitch vehicle by the mechanism of this invention.

The mower mounting apparatus has a main frame, the heart of which is a beam, or main frame member 40. As seen in FIG. 2, beam 40 extends transversely to the direction of travel of the tractor and is spaced rearwardly from the rearmost ends of drawbars 21 and 22. The mower 38 is connected to beam 40 by a drag bar 41 having a mower carrying yoke 42 at its outer end. FIGS. 4 and 5 show the relationship between the drag bag 41 and the main frame beam 40. A short shaft 44 is fixedly mounted on the under side of beam 40 and extends horizontally rearwardly therefrom. A collar 45 is journalled on the rearwardly extending end of shaft 44. Collar 45 carries a lug 46 through which drag bar 41 is connected by a generally vertically extending pivot pin 48. Thus, the drag bar is vertically swingable relative to the main frame about horizontal fore-and-aft extending shaft 44 and horizontally swingable about generally vertical pivot pin 48. In normal operation, the drag bar is inclined downwardly and laterally from shaft 44 as may be seen in FIGS. 5 and 3.

Under normal operating conditions, the drag bar is kept from swinging horizontally rearwardly about pin 48 by a latch mechanism which is adapted to release the drag bar for rearward swinging movement if an immovable object is engaged by the mower. The break-away latch mechanism is visible in FIGS. 1, 2 and 3 at the numeral 49, but it is more readily seen and understood from the showing in FIGS. 8, 9 and 10. On the end of main frame beam 40 adjacent the yoke 42 of drag bar 41 is journalled a vertically disposed pivot member 50. A horizontally disposed pivot member 51 is mounted between a pair of downwardly projecting lugs on the under side of a plate 52 which is mounted at the point where yoke 42 and drag bar 41 meet. A first arm 54 is rigidly connected to pivot member 50 and extends generally forwardly therefrom (see FIG. 10). A second arm 55 is connected to horizontal pivot member 51 on the yoke and drag bar and extends forwardly therefrom to the forward end of arm 54. Arm 55 is shown diagrammatically in FIG. 10. The forward end of first arm 54 carries a vertical pivot member 56. Referring now to FIG. 1, on the lower end of pivot member 56 is journalled a plate 58 which carries a horizontal pivot member 59. The forward end of second arm 55 is journalled on the horizontal pivot member 59. This structure results in a form of toggle joint extending between pivot member 50 on beam 40 and pivot member 51 on plate 52 of the drag bar. The normal position of these members is shown in FIG. 8. Extending forwardly from the end of beam 40 adjacent yoke 42 is short channel member 60. A latch plate 61 is carried on the forward end of member 60 and biased rearwardly into engagement therewith by a spring 62. As clearly seen in FIGS. 8 and 10, latch plate 61 has a hooked end which engages the pivot member 56 at the forward end of arm 54. This holds the parts in the position shown in FIG. 8 under normal operating conditions. If the mower, which is carried on yoke 42, engages an immovable object, the holding force of spring 62 is overcome and the latch plate 61 releases the toggle joint arms 54 and 55. This is shown in FIG. 10. The arm 54 is then free to swing rearwardly about pivot member 50, and the drag bar is free to swing rearwardly relative to beam 40 about vertical pivot member 48 until the break-away latch arms 54 and 55 are fully extended rearwardly from pivot member 50. This provides the tractor operator with time to stop the tractor without damaging the mower if an immovable object is encountered by the mower. As seen in FIG. 8, the tension of latch spring 62 is adjustable by a nut-bolt 64 as is well known in the art. The break-away mechanism does not interfere with vertical swinging of the drag bar about shaft 44, because of the horizontal axes of pivot members 51 and 59 at the ends of the second arm 55 of the break-away mechanism.

The power which drives the mower to produce its cutting action comes from the power-take-off shaft of the tractor. In FIGS. 1, 2 and 3, the power-take-off shaft may be seen in phantom projecting rearwardly from the center of the tractor between the drawbars at 65 and carrying a universal joint yoke. An extension shaft 66 is connected to the yoke on the tractor power-take-off shaft and extends rearwardly to, and over the top of, the main frame beam 40. A short shaft 68 (FIG. 1) is journalled in a sleeve 69 which is supported by a bracket 70 mounted on beam 40. The bracket 70 is best seen in phantom in FIG. 3; although, the top of the bracket is visible in FIG. 1 in solid lines. The power-take-off extension shaft 66 is universally connected to forward end of the short shaft 68. A V-belt pulley 71 is keyed to the rear end of shaft 68 and therefore rotates with the tractor power-take-off shaft 65. A V-belt 72 is entrained around pulley 71 and a driven pulley 74 on the mower. The shaft 75 of the mower pulley 74 may extend through the arms of the drag bar yoke 42 and serve to attach the mower to the yoke as well as serving to drive the mower in its cutting action; or the arms of drag bar 42 may be connected to the mower by any conventional pivot members.

Referring now jointly to FIGS. 1, 2 and 4: transverse frame beam 40 has been discussed as the heart of the main frame. The remainder of the main frame will now be considered. In FIG. 4 a number of holes 76 are visible in beam 40. The beam 40 is connected into a pair of channel members 78 by bolts 79 which extend through the channel members and through the holes 76 in beam 40. The excess holes 76 enable the beam 42 to be shifted transversely relative to the tractor in the channel members 78. In this manner, the mower mounting apparatus may be adjusted to accommodate tractors whose rear wheels may be set further apart than those of the tractor 20 shown. Obviously, the beam 40 should be mounted in the members 78 in such position that the mower cutter bar 80 lies outside the right rear tractor wheel. The channel members 78 are rigidly mounted on the respective ends of an inverted U-shaped mast 81. The mast 81 is inclined forwardly toward the tractor, as best seen in FIG. 1; and it carries at its bight a pair of plates in and between which is carried a pivot member 82 having a horizontal axis transverse to the direction of travel. Rigidly connected to the main frame channel members 78 and the respective ends of the inverted U-shaped mast 81 are drawbar mounting plates 84–84' and 85–85' (FIGS. 4 and 2). The two plates 84 and 84' serve as one single member and the two plates 85 and 85' also serve as one single member. Needless to say, a single plate of sufficient strength could be substituted for each of the pairs of plates 84–84' and 85–85'. A first universally movable ball joint connector 86 is carried by plates 84–84' and a second identical connector 88 is carried by the plates 85–85'. The beam 40, the channel members 78, the inverted U-shaped mast 81 and the drawbar mounting plates 84–84' and 85–85' constitutes the basic members of the main frame. As best seen in FIG. 2, the two tractor drawbars 21 and 22 are connected, respectively, to the main frame ball joint connectors 86 and 88. In this manner, the main frame and everything carried thereby is carried by the drawbars for vertical swinging movement therewith relative to the tractor. An upper link 89 (see FIG. 1) is pivotally connected to the pivot member 82 on the mast and extends forwardly to the upper rear hitch member 26 on the tractor. The link 89 is usually adjustable in length and is actually a part of the three point hitch linkage of the tractor. On conventional three point hitch mower mounting apparatus the link 89 would be connected directly to the connecting pin 92 of the upper rear tractor hitch member 26. The purpose of link 89 is to stabilize the mower mounting apparatus against tipping in the fore-and-aft direction when the mounting apparatus is raised by the drawbars. In the present invention, the same purpose is served by connecting the forward end of the link 89 to a horizontal pivot pin 90 carried by a pair of rigid plates 91–91' (FIG. 2) which are, in turn, connected to the horizontal pivot pin 92 of upper rear hitch member 26 of the tractor. If the tractor were provided with a rear hitch member 26 having a plurality of connecting pins 92, as some tractors have, the link 89 could be connected to one of the pins and the plates 91–91' connected to another of the pins.

Referring now primarily to FIGS. 1, 2 and 6, the plates 91–91' are fixedly mounted on the bight portion of a U-shaped member 94 whose respective arms 95 and 96 extend downwardly and rearwardly from the upper rear hitch member 26 of the tractor. The arms 95 and 96 extend rearwardly symmetrically relative to a fore-and-aft extending vertical plane through the tractor upper rear hitch member 26, as do the drawbars 21 and 22. As best seen in FIG. 6 the arms 95 and 96, respectively, carry extension members 98 and 99. The members 98 and 99 are slidably adjustable in sleeves 100 and 101 which are carried, respectively, on arms 95 and 96. FIG. 7 best shows how the member 99 is clamped against sliding movement relative to arm 96. The sleeve 101 is U-shaped in cross section and is rigidly connected to arm 96 by welds 102. Sleeve 101 is formed with a rectangular opening 104 in its upper surface and a similar opening 105 in its lower surface. An apertured block 106 of wedge shaped cross section sits in opening 104 and rests on and between arm 96 and extension 99. An identical block 108 is provided in opening 105 on the under side of U-shaped sleeve 101. A bolt-like member 109 extends down through blocks 106 and 108 and carries a nut 110 at its lower end. On the upper end of the bolt-like member 109 is mounted a handle 111.

As will be obvious from FIG. 7, rotation of the bolt-like member 109 in one direction by handle 111 will draw the wedge shaped blocks 106 and 108 together and squeeze extension 99 into the bight of U-shaped sleeve 101 thereby preventing member 99 from sliding in the sleeve. Rotation of the bolt-like member 109 in the opposite direction by handle 111 will loosen the wedge shaped blocks 106 and 108 and permit extension 99 to be moved in sleeve 101. The nut 110 may be recessed into the lower wedge shaped block 108, as may be seen in FIG. 7, whereby it is unnecesary to hold the nut 110 with a wrench when the bolt-like member 101 is turned.

The clamping mechanism for extension member 98 on arm 95 is identical to that just described for member 99 on arm 96. One reason for the adjustability of the length of the arms 95 and 96 is to enable the mower mounting apparatus to be mounted on any three point hitch tractor even though the location of the upper rear hitch member connecting pin 92 will vary from one tractor to the next. Other reasons for the adjustability of these members will be brought out later on in the specification.

After the length of the arms 95 and 96 is adjusted for the particular tractor on which the apparatus is to be mounted, the extensions 98 and 99 are locked against movement relative to the sleeves 100 and 101 by the clamping mechanism just described. A pair of collars 112 and 114 (FIG. 6) are, respectively, slidably carried on extension members 98 and 99. These collars may be disposed in engagement with one end of each of the U-shaped sleeves 100 and 101 and locked in that position by bolts or set screws engaging the respective extension members 98 and 99 as shown at 115 in FIG. 6. Then, if the extension members 98 and 99 are moved rearwardly for any reason, proper length of the arms may be easily re-established by sliding the extension members forwardly until the collars engage the ends of sleeves 100 and 101. In normal operation of the apparatus the arm 95 and its adjustable extension member 98 act as a single rigid arm. The arm 96 with extension 99 also acts as a single rigid arm. This first pair of arms carry yokes 116 and 118 respectively on their rearmost ends (see FIG. 6).

Referring now to FIGS. 6, 4, 1 and 2, the yokes 116 and 118 are pivoted, respectively, to a second pair of arms 120 and 121 by horizontal pivot pins 122 and 124. The second pair of arms 120 and 121 are pivotally carried respectively, on main frame plates 84–84' and 85–85' by horizontal pivot members 125 and 126. The arms 120 and 121 extend forwardly from the pivot members 125 and 126. The result of this linkage is to form a pair of toggle joints one of which is formed by arm 95 (including the extension 98 of arm 95) and arm 120 and the other of which is formed by arm 96 (including extension 99 thereof) and arm 121.

Referring now to FIGS. 12 and 13, since the arms 95–98 and 96–99 are rigid and are anchored to connecting pin 92 on the upper rear tractor hitch member 26, and since the arms 120 and 121 are rigid and are anchored to main frame plates 84–84' and 85–85' by pivot members 125 and 126; raising of the main mower mounting frame (members 81, 84–84', 85–85', 78 and 40) by the tractor drawbars 21 and 22 results in the rigid arms 95–98 and 96–99 exerting a downward and rearward thrust on the forwardmost ends of arms 120 and 121 at pivot pins 122 and 124. This causes a counterclockwise pivoting of arms 120 and 121 about their respective pivot members 125 and 126 relative to the main frame. This motion is utilized in several different ways.

The downward pivoting movement of arm 120 (see FIGS. 1, 12 and 13) exerts a pull on cable 128 which has one end anchored to a bracket 129 mounted on arm 120. Referring now to FIGS. 3 and 11, from bracket 129 the cable 128 extends around a pulley 130 (see FIGS. 1 and 2) which is carried by an arm 131 on the mast 81 of the main frame. From pulley 130 the cable 128 extends transversely across the back of the apparatus and has its other end anchored at 132 (FIGS. 3 and 11) to an upwardly extending lever 134 which is pivoted to the drag bar yoke 42 by a horizontal pivot pin 135. As is best seen in FIG. 2, the lever 134 is made of two identical plates spaced apart to receive cable 128 therebetween. The anchoring pin 132 and the pivotal mounting pin 135 extend through both plates. The lever 134 is pivotal about pin 135 toward and away from mower cutter bar 80. The two extreme positions of arm 134 relative to drag bar 41 are shown, respectively, in FIGS. 3 and 11. In FIG. 3 the cutter bar is in mowing position. A chain 136 extends from lever 134 to a portion of the mower 38 which is rigid with the cutter bar. Thus, when lever 134 pivots relative to the drag bar, the cutter bar is also pivoted about shaft 75 relative to the drag bar. A stop member 138 is mounted on the lower left corner of lever 134 as seen in FIGS. 3 and 11. Stop 138 is also visible in FIG. 2. Stop 138 is adapted to engage the drag bar 41 as seen in FIG. 11 to limit pivotal movement of lever 134 relative to the drag bar in the direction away from the mower.

When the toggle joint arm 120 exerts a pull on cable 128 in response to raising of the tractor drawbars, the cutter bar 80 is initially pulled from the operative mowing position shown in FIG. 3 to the raised inoperative position shown in FIG. 11. This pull of the cable also moves lever 134 from the FIG. 3 position to the FIG. 11 position wherein stop 138 engages the drag bar 41 and prevents further pivoting of lever 134 about pin 135. This initial pull on the cable 128 raises the cutter bar 80 off the ground very quickly. Further pull on cable 128, which occurs if the drawbars are raised higher, causes the entire drag bar to swing vertically upwardly to a transport position about the fore-and-aft extending shaft 44 on which the drag bar is journalled. Raising of the drag bar and mower is facilitated by the provision of a larger counter balancing spring 139 which extends from an arm 140 on the mast 81 of the main frame to the lever 134, as best seen in FIGS. 2 and 3.

As clearly seen in FIGS. 3 and 11, a special supporting surface 141 is provided at the upper end of lever 134. The mower 38 may be pivoted counterclockwise, as viewed in FIGS. 3 and 11, relative to the drag bar yoke 42 until the cutter bar 80 comes to rest on surface 141 of lever 134. This is a storage position for the cutter bar when it is not in use. Naturally, the mower may be transported with the cutter bar in storage position.

Referring now to FIGS. 1 and 3 of the drawings, a pair of rigid supporting members in the form of legs, or runners, 142 and 144 are mounted on the main frame. As seen in FIGS. 1, 2 and 3, these members may be conveniently attached to main frame plates 84 and 85 and to main frame channel members 78. The supports 142 and 144 extend downwardly below main frame beam 40 a distance less than the outer end of drag bar 41 when the drag bar is in the operative position shown in FIG. 3. When the mower cutter bar 80 is raised to its storage position wherein it rests on surface 141 of lever 134 and extends upwardly and to the left in FIG. 3 parallel to surface 141, the center of gravity of the mower-drag bar assembly shifts to the left in FIG. 3 and, with the aid of counter balancing spring 139, the drag bar swings upwardly about shaft 44 to a position higher than the bottom of supports 142 and 144. If the entire apparatus is then lowered to the ground by lowering the tractor drawbars, the entire unit will rest on runners 142 and 144 with all the mower mechanism supported up off the ground. The unit will also be in proper position and attitude for reconnecting to the tractor again. The lower, or yoke, end of the drag bar may also be raised above the bottoms of runners 142 and 144 without the cutter bar being moved to its storage position. Sufficient pull on cable 128, by raising the tractor drawbars high enough, will elevate the drag bar above supports 142 and 144 even though the cutter bar 80 will only be raised to the position shown in FIG. 11 relative to the drag bar.

In FIG. 13, a stop member 145 may be seen at the forward end of plate 84. In FIG. 12 the stop member 145 is in engagement with the upper edge of the arm 120. Stop 145 is also visible in FIGS. 1 and 2. In FIG. 2 it may be seen that an identical stop 145' is disposed vertically above the arm 121 at the other side of the mounting apparatus. As best seen in FIG. 2, the stops 145 and 145' are mounted respectively on the inboard sides of plates 84' and 85' of the main frame. Referring again to FIGS. 12 and 13, when the drawbars are lowered from a raised position, such as shown in FIG. 13, the arms 120 and 121 are pulled clockwise about their pivots 125 and 126, respectively, by the first pair of rigid arms 95 and 96. When the arms 120 and 121 engage stops 145 and 145', the apparatus can be lowered no further. Even if the hydraulic pressure of the tractor lift system were completely released, the drawbars could drop no further once arms 120 and 121 engage stops 145 and 145'. Thus, the mower mounting apparatus is held at proper operating height independently of the tractor hydraulic system. If the tractor employed to mount the apparatus were larger, or higher, than the one shown in the drawings, the proper operating height of the apparatus would still be the same as shown in FIG. 12 relative to the ground, but it would be lower than the position shown in FIG. 12 relative to the tractor. This adjustment is made by increasing the length of arms 95–98 and 96–99 in the manner discussed in connection with FIGS. 6 and 7 of the drawings, so that arms 120 and 121 engage stops 145 and 145' when the mounting apparatus is in the position shown in FIG. 12 relative to the ground. To lower the apparatus to rest on the ground on its support 142 and 144 (FIGS. 1 and 12), the extensions 98 and 99 are first loosened by handles 111 for sliding movement in sleeves 100 and 101 relative to arms 95 and 96. The drawbars may then be lowered below the FIG. 12 position until supports 142 and 144 rest on the ground. The reverse of this procedure is employed to mount the mechanism on the tractor and establish the proper operating height relative to the ground.

Referring now to FIG. 2 and concerning the geometric relationship of the first pair of arms 95–98 and 96–99, the second pair of arms 120 and 121, and the drawbars 21 and 22 as affected by side sway of the mower mounting main frame relative to the tractor. Assuming that the mower mounting apparatus is swinging horizontally to the right relative to the direction of travel of the tractor, this would be upwardly as seen in FIG. 2. The drawbar 22 having its ends at ball joint connectors 25 and 88 would swing upwardly (FIG. 2) about ball joint connector 25. The other drawbar 21, having its ends at ball joint connectors 24 and 86 would swing upwardly (FIG. 2) about ball joint connector 24. The pivot members 126 and 125, to which the arms 121 and 120 are connected, would swing in arcs parallel to the ball joint connectors 88 and 86, since the members 126, 125, 88 and 86 are all carried on rigid plates 84-84' and 85-85' of the main frame. However, as the pivot member 126 swings upwardly about ball joint connector 25, the distance between pivot member 126 and pivot pin 92 of the tractor upper rear hitch member becomes greater. The toggle joint formed by arm 96-99 and arm 121 could allow this increase in distance by (see the side view of FIG. 1, 12 or 13 wherein the members 96-99, 121 and 126 are directly behind and hidden by members 95-98, 120, and 125) opening up, or straightening up, until the arm 96-99 and arm 121 extended in a straight line between the pivot members 126 and 92. On the other side of the apparatus, as pivot member 125 swings upwardly about ball joint connector 24 (FIG. 2) the distance between the pivot member 125 and pivot pin 92 on the tractor upper rear hitch member becomes shorter. The toggle joint formed by arm 95-98 and arm 120 could allow this decrease in distance (see FIGS. 1, 12 or 13) by closing up, or deceasing, the angle between arms 95-98 and 120 (by pivoting about pivot member 122). The result of this side sway to the right (upwardly in FIG. 2) on the arms 120 and 121 of the toggle joints would be to swing arm 121 vertically upwardly (clockwise in FIGS. 1, 12 or 13) about pivot member 126 due to its connection at 124 to arm 96-99, while swinging arm 120 downwardly (counterclockwise in FIGS. 1, 12 and 13), about pivot member 125 due to its connection at 122 to arm 95-98. The arms 120 and 121 would each be swung in the opposite directions if the apparatus as a whole moved horizontally to the left (downwardly in FIG. 2) relative to the tractor.

Side sway of the mower and the mower mounting apparatus is to be prevented, however. It will be seen in FIGS. 1 and 2 that a rigid torsion resistant tubular frame member 150 extends between arms 120 and 121 and has its ends rigidly connected, as by welding, to the arms 120 and 121. This torsion bar frame member 150 prevents any dissimilar motion between arms 120 and 121. In other words, it prevents one of the arms 120 or 121 from swinging upwardly while the other arm swings downwardly. This prevention of dissimilar movement of the arms 120 and 121, and hence the toggle joints of which each of these arms is a part, prevents side sway of the mounting apparatus as a unit relative to the tractor; regardless of the fact that the ball joint connectors and loose fitting pivot pin 92 would allow side sway. No additional braces are required to prevent side sway. It should also be noted that since the drawbars and the various arms of the toggle joints are symmetrical relative to a fore-and-aft extending vertical plane through the tractor upper rear hitch member, the torsion member 150 offers no resistance to vertical movement of the mounting apparatus. This is because vertical movement of the mounting apparatus produces simultaneous identical motion in both toggle joints, or both arms 120 and 121, and thus introduces no stress on the torsion bar 150. The effectiveness of torsion bar 150 to prevent side sway of the apparatus is unaffected by the position of the mounting apparatus relative to the ground. Regardless of the position of the arms 120 and 121, any side sway of the unit attempts to open one of the toggle joints and close the other one. This produces a torsional stress on member 150 which that member resists. Side sway of the apparatus as a unit relative to the tractor is prevented without the necessity of supplemental braces.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. Apparatus for mounting a mower on a tractor wherein the tractor has an upper rear hitch member having a horizontal pivot pin disposed in a fixed position on said tractor and a pair of generally rearwardly extending swingable drawbars, said apparatus comprising a main frame, a mower carried on said main frame, means connecting said main frame to said pair of drawbars for movement therewith relative to said tractor, a first pair of arms journaled on said fixed pivot pin of said rear hitch member for vertical pivotal movement about the axis of said pin, said arms extending rearwardly from said hitch member symmetrically relative to a fore-and-aft extending vertical plane through said hitch member, a pair of laterally spaced horizontal pivot members disposed in fixed positions on said main frame, a second pair of laterally spaced arms respectively journaled on said pair of laterally spaced horizontal pivot members for vertical pivotal movement about the respective axes of said pivot members, said second pair of arms extending forwardly from said main frame symmetrically relative to said vertical plane, means pivotally connecting the forward ends of said second pair of arms respectively to the rear ends of said first pair of arms and forming a pair of laterally spaced toggle joints disposed symmetrically relative to said vertical plane whereby movement of said main frame relative to said hitch member and parallel to said vertical plane produces similar movements in each of said toggle joints, and a frame member rigidly interconnecting said pair of toggle joints and preventing dissimilar movement thereof to thereby resist movement of said main frame relative to said hitch member in directions other than parallel to said vertical plane.

2. Apparatus for mounting a mower on a tractor as recited in claim 1 wherein said frame member rigidly interconnecting said pair of toggle joints comprises a torsion bar extending transversely between said second pair of arms and having its ends rigidly connected respectively to said second pair of arms.

3. Apparatus for mounting a mower on a tractor as recited in claim 1 wherein stop means is provided on said main frame in position to engage and limit the extent of pivotal movement of said second pair of arms in one direction relative to said main frame thereby limiting the extent of vertical movement of said main frame relative to said hitch member in one direction.

4. Apparatus for mounting a mower on a tractor as recited in claim 3 wherein each of the arms of said first pair of arms comprises two relatively slidable members, and means releasably locking said members against relative sliding movement whereby the length of said first pair of arms may be selectively varied to adjust the position of said second pair of arms relative to said stop means to thereby regulate the extent of movement of said second pair of arms prior to engagement with said stop means.

5. Apparatus for mounting a mower on a tractor wherein the tractor has an upper rear hitch member and a pair of generally rearwardly extending swingable drawbars, said apparatus comprising a main frame, means connecting said main frame to said pair of drawbars for movement therewith relative to said tractor, a drag bar normally extending transversely of said main frame and having one end connected thereto for vertical swinging movement, a generally transversely extending cutterbar having one end connected to the other end of said drag bar for vertical swinging movement relative to said drag bar, a first pair of arms extending rearwardly from said hitch member symmtrically relative to a fore-and-aft extending vertical plane through said hitch member, means pivotally connecting said first pair of arms to said hitch member for vertical pivotal movement, a second pair of arms pivotally connected to said frame and extending forwardly therefrom symmetrically relative to said vertical plane, means pivotally connecting the forward ends of said second pair of arms respectively to the rear ends of said first pair of arms to form a pair of laterally spaced toggle joints disposed symmetrically relative to said vertical plane whereby movement of said main frame relative to said hitch member and parallel to said vertical plane produces similar movements in each of said toggle joints, a flexible member having one end connected to one of said toggle joints and the other end connected to said cutterbar whereby movement of said one of said toggle joints in one direction exerts tension on said flexible member thereby swinging said cutterbar vertically relative to said drag bar, and a torsion bar extending transversely between said second pair of arms and having its ends rigidly connected respectively thereto and preventing dissimilar movement of said toggle joints thereby resisting movement of said main frame relative to said hitch member in directions other than parallel to said vertical plane.

6. Apparatus for mounting a mower on a tractor as recited in claim 5 wherein a lever is mounted on said drag bar for pivotal movement toward and away from said cutterbar, means connecting said lever to said flexible member whereby the application of tension to said flexible member by said one of said toggle joints effects pivotal movement of said lever relative to said drag bar simultaneously with said cutterbar, and stop means limiting pivotal movement of said lever relative to said drag bar and thereby limiting the extent of swinging movement relative to said drag bar impartable to said cutterbar by said flexible member, further application of tension to said flexible member after engagement of said lever stop means swinging said drag bar vertically relative to said main frame to a transport position, and support members on said main frame and extending downwardly therefrom, said support members having a downward extension less than that of the drag bar in its normal position and greater than that of the drag bar in its transport position.

7. Apparatus for mounting a mower on a tractor wherein the tractor has an upper rear hitch member and a pair of generally rearwardly extending drawbars, said apparatus comprising a main frame connected to said drawbars, means interconnecting said main frame and said rear hitch member, a drag bar normally extending transversely of said main frame, pivot means connecting one end of said drag bar to said main frame for vertical swinging movement between a lowered normal position and a raised transport position, the other end of said drag bar projecting below the lowermost portion of said main frame in said normal position, and ground engageable support members fixed rigidly on said main frame, said support members extending downwardly from said main frame a distance less than said other end of the drag bar when the drag bar is in normal position and greater than said other end of the drag bar when the drag bar is in raised transport position.

8. Apparatus for mounting a mower on a tractor having a pair of vertically swingable drawbars, said apparatus comprising a main frame, a mower carried on said main frame, means connecting said main frame to said pair of drawbars for vertical movement therewith relative to said tractor, a first arm having one end pivoted to said tractor in a fixed position for vertical swinging movement, a second arm having one end pivoted to said main frame in a fixed position for vertical swinging movement, and pivot means interconnecting the other ends of said first and second arms, said first and second arms having a combined length greater than the straight line distance between said fixed position on said tractor and said fixed position on said main frame and moving relative to each other and to said main frame in response to lowering of said main frame by said drawbars, stop means on said main frame engaging said second arm and limiting movement thereof to thereby limit downward movement of said main frame, said first arm being formed of two slidably adjustable members, and means releasably locking said two members against sliding movement whereby the length of said arm may be adjusted to vary the extent of downward movement of said main frame.

9. Apparatus for mounting a mower on a tractor wherein the tractor has an upper rear hitch member and a pair of generally rearwardly extending swingable drawbars, said apparatus comprising a main frame, a mower carried on said main frame, means connecting said frame to said drawbars for vertical swinging movement therewith relative to said tractor, a torsion bar having a longitudinal axis, means mounting said torsion bar on said frame, and means connecting the respective ends of said torsion bar to said hitch member and exerting torsional stress on said bar about the axis thereof in response to lateral movement of said frame relative to said hitch member whereby lateral movement of said frame relative to said tractor is opposed by the resistance of said torsion bar to stress.

10. Apparatus for mounting a mower on a tractor wherein the tractor has an upper rear hitch member and a pair of generally rearwardly extending swingable drawbars, said apparatus comprising a transversely extending horizontal base member disposed rearwardly of said draw bars, a pair of laterally spaced fore-and-aft extending frame members rigidly mounted on said base member and extending forwardly therefrom, a generally U-shaped mast having its legs mounted on said base member and extending upwardly therefrom with the bight of the U at the top, pivot means connecting said laterally spaced fore-and-aft extending frame members respectively to said drawbars, a fore-and-aft extending stabilizer bar having one end pivotally connected to the bight of said U-shaped mast, said stabilizer bar extending forwardly from said mast and being pivotally connected to said upper rear tractor hitch member whereby said base member is supported on said drawbars for swinging movement therewith and held against fore-and-aft tipping by said stabilizer bar, a generally U-shaped frame member having the bight portion pivotally connected to said rear hitch member of the tractor and the legs extending downwardly and rearwardly therefrom symmetrically relative to a fore-and-aft extending vertical plane through said hitch member, a pair of fore-and-aft extending lever arms having their rear ends pivotally mounted respectively on said pair of laterally spaced fore-and-aft extending frame members for vertical swinging movement relative thereto, means pivotally connecting the forward ends of said pair of lever arms respectively to the legs of said U-shaped frame member and forming therewith a pair of laterally spaced toggle joints, said toggle joints being disposed symmetrically relative to said vertical plane through said hitch member whereby vertical raising and lowering of said base member by said drawbars effects similar closing and opening of said toggle joints while lateral swinging or tipping of said base member effects dissimilar closing and opening of said toggle joints, a rigid frame member extending transversely between said lever arms and having its ends rigidly connected respectively to said lever arms intermediate the ends of the lever arms and resisting dissimilar movement of said toggle joints thereby resisting lateral swinging or tipping of said base member, a mower unit, and means supporting said mower unit on said base member.

(References on following page)

References Cited by the Examiner

UNITED STATES PATENTS

| | | | |
|---|---|---|---|
| 2,515,637 | 7/50 | Dooley et al. | 172—144 |
| 2,580,267 | 12/51 | Abgarian | 56—25 |
| 2,616,349 | 11/52 | Lindeman et al. | 280—461 |
| 2,796,713 | 6/57 | Richey | 56—25 |
| 2,669,825 | 2/54 | Preble et al. | 56—25 |
| 2,747,486 | 5/56 | Wilson | 172—449 X |
| 2,796,713 | 6/57 | Richey | 56—25 |
| 2,860,472 | 11/58 | Fergason | 56—25 |
| 2,867,959 | 1/59 | Peak | 56—25 |
| 2,914,342 | 11/59 | Silver et al. | 280—461 |
| 2,984,960 | 5/61 | Wathen et al. | 56—25 |
| 3,014,328 | 12/61 | Scarnato et al. | 56—25 |
| 3,110,146 | 11/63 | Latshaw | 56—25 |

T. GRAHAM CRAVER, *Primary Examiner.*

RUSSELL R. KINSEY, *Examiner.*